(12) United States Patent
Onodera

(10) Patent No.: US 9,346,351 B2
(45) Date of Patent: May 24, 2016

(54) VALVE DEVICE

(71) Applicant: DENSO CORPORATION, Kariya, Aichi-pref. (JP)

(72) Inventor: Hirofumi Onodera, Kariya (JP)

(73) Assignee: DENSO CORPORATION, Kariya (JP)

( * ) Notice: Subject to any disclaimer, the term of this patent is extended or adjusted under 35 U.S.C. 154(b) by 62 days.

(21) Appl. No.: 14/315,650

(22) Filed: Jun. 26, 2014

(65) Prior Publication Data

US 2015/0000772 A1    Jan. 1, 2015

(30) Foreign Application Priority Data

Jun. 26, 2013 (JP) ................................. 2013-133346

(51) Int. Cl.
   *F17D 1/00* (2006.01)
   *B60K 15/035* (2006.01)
   *B60K 15/03* (2006.01)

(52) U.S. Cl.
   CPC . *B60K 15/03519* (2013.01); *B60K 2015/03296* (2013.01); *B60K 2015/03514* (2013.01); *Y10T 137/87265* (2015.04)

(58) Field of Classification Search
   CPC ........... F02M 25/0836; F02M 25/0845; F16K 24/04; F16K 31/0655; B60K 15/03519
   USPC .................. 137/587, 599.11, 599.18, 601.14, 137/601.21; 123/516, 519, 520; 251/129.15
   See application file for complete search history.

(56) References Cited

U.S. PATENT DOCUMENTS 5,069,188 A * 12/1991 Cook ................. F02M 25/0836
                                                    123/516
5,406,975 A *  4/1995 Nakamichi ......... F16K 31/0655
                                                    137/495
5,509,395 A *  4/1996 Cook ................. F02M 25/0836
                                                    123/518
5,603,349 A *  2/1997 Harris ................. B60K 15/035
                                                    123/519

(Continued)

FOREIGN PATENT DOCUMENTS

JP          03-073657          7/1991

OTHER PUBLICATIONS

Office Action (2 pages) dated Jun. 23, 2015, issued in corresponding Japanese Application No. 2013-133346 and English translation (2 pages).

*Primary Examiner* — John K Fristoe, Jr.
*Assistant Examiner* — Reinaldo Sanchez-Medina
(74) *Attorney, Agent, or Firm* — Nixon & Vanderhye P.C.

(57) ABSTRACT

A valve device includes a first passage opened by a first valve member, a second passage opened by a second valve member, and a specific chamber in which an asymmetrical state is caused. When the second valve member is open, escape fluid flows through the specific chamber just before flowing into a second passage and collides a collision part located in the specific chamber. The escape fluid flowing in the specific chamber collides the collision part and is divided into two divided flows, and the two divided flows are joined again at downstream of the collision part. In the asymmetrical state, a difference is caused in a pressure loss between the two divided flows. By the asymmetrical state, a pressure loss as an entire of the specific chamber decreases, and frequency in using a valve mechanism can be reduced. Therefore, the valve mechanism can be used longer without omitting the specific chamber.

4 Claims, 6 Drawing Sheets

(56) References Cited

U.S. PATENT DOCUMENTS

| | | | |
|---|---|---|---|
| 7,267,113 B2 * | 9/2007 | Tsuge | F02M 25/0836 123/520 |
| 2002/0026960 A1 * | 3/2002 | Weldon | F02M 25/0836 137/601.14 |
| 2006/0081801 A1 * | 4/2006 | Takahashi | F02M 25/0836 251/129.15 |
| 2006/0185735 A1 | 8/2006 | Tsuge et al. | |
| 2010/0269921 A1 * | 10/2010 | Pifer | B60K 15/03519 137/487.5 |
| 2012/0255639 A1 * | 10/2012 | Onodera | F02M 25/0836 137/637 |

* cited by examiner

VALVE DEVICE

CROSS REFERENCE TO RELATED APPLICATION

This application is based on Japanese Patent Application No. 2013-133346 filed on Jun. 26, 2013, the disclosure of which is incorporated herein by reference in its entirety.

TECHNICAL FIELD

The present disclosure relates to a valve device to be mounted to a purge system of a fuel tank in a vehicle. The valve device is capable of opening the fuel tank to an outside.

BACKGROUND

Conventionally, a purge system of a vehicle for purging fuel vapor is known to have a valve device (e.g., a tank-sealing valve). The tank-sealing valve opens an air space provided in the fuel tank to the outside via a canister so that fuel is supplied smoothly into the fuel tank in a refueling. Further, the tank-sealing valve restricts an increase of a pressure (e.g., an inside-tank pressure) in the air space. That is, the tank-sealing valve has a first valve member opening or closing the fuel tank to the outside. By operating the first valve member, fuel including fuel vapor escapes and flows out of the fuel tank. The tank-sealing valve is required to be downsized, to be easy to handle pipes, and to be located as close to the fuel tank as possible. Based on such requirements, the tank-sealing valve has a passage configuration, for example, including a first passage, a second passage, and a specific chamber.

Fluid (i.e., escape fluid) flowing out of the fuel tank flows through the first passage when the first valve member is open. The second passage is provided separately from the first passage, and the escape fluid flows through the second passage when a second valve member disposed separately from the first valve member is open. The specific chamber is provided at an outer periphery side of a pipe providing the first passage and at an outer periphery side of the first valve member. The escape fluid flows through the specific chamber just before flowing into the second passage when the second valve body is open. In the specific chamber, the escape fluid flowing into the specific chamber collides an outer surface of the pipe or the like and is divided into two divided flows. The two divided flows are joined again at downstream of the pipe, or the like, in a flow direction of the escape fluid and then flow into the second passage.

The tank-sealing valve further has, for example, an electromagnetic solenoid, which generates magnetic attractive force when a power source mounted in the vehicle applies electric force to the tank-sealing valve. The first valve member is operated to be open based on the magnetic attractive force generated by the electromagnetic solenoid. When the first valve member is open, the escape fluid flows into the first passage via the first valve member and flows out of the fuel tank (see JP-A-2006-226457 corresponding to U.S. 2006/0185735 A1).

The second valve member has a structure as a check valve. The second valve member is open so that the escape fluid flows into the second passage via the second valve member when a pressure of the escape fluid is higher than a predetermined valve-opening pressure. The second valve member is closed so that the escape fluid is restricted from flowing into the second passage when a pressure of the escape fluid is lower than a predetermined valve-closing pressure. Accordingly, the tank-sealing valve is capable of restricting an increase of a pressure in the fuel tank by opening or closing the second valve member without an electric supply from the power source. The second valve member and peripheral parts configure a relief valve, separately from a main part of the tank-sealing valve including the first valve member, the first passage, the specific chamber, or the like. The second valve member and the peripheral parts are simply referred to as the relief valve.

In the tank-sealing valve, a large pressure loss of the escape fluid is caused in the specific chamber when the relief valve is open, and frequency of opening or closing of the relief valve becomes high. As a result, the relief valve may be damaged earlier. Specifically, a large pressure loss is caused in the specific chamber since the escape fluid collides the outer surface of the pipe or the like and is divided into the two divided flows, and the two divided flows are joined again.

Furthermore, the tank-sealing valve is required to have the passage configuration including the first passage, the second passage, and the specific chamber based on the requirements described above. Therefore, the specific chamber is difficult to be omitted.

SUMMARY

The present disclosure addresses at least one of the above issues, and it is an objective of the present disclosure to provide a valve device in which frequency in using of a relief valve can be reduced without omitting a specific chamber, and the relief valve can be used longer.

According to the present disclosure, a valve device has a first valve member opening or closing a fuel tank to the outside and operates the first valve member so that fluid flows out of the fuel tank.

The valve device includes a first passage, a second passage, and a specific chamber. Fluid flowing out of the fuel tank flows through the first passage when the first valve member is open. The second passage is provided separately from the first passage. The fluid flowing out of the fuel tank flows through the second passage when a second valve member is open. The specific chamber is arranged upstream of the second passage so that the fluid flowing out of the fuel tank flows into the specific chamber just before flowing into the second passage. A collision part being symmetrical in a mirror image is disposed in the specific chamber. In the specific chamber, the fluid flows and collides the collision part and is divided into two divided flows due to the collision part when the second valve member is open. The two divided flows are in an asymmetrical state in which one of the two divided flows has a different pressure loss from that of the other one of the two divided flows.

Accordingly, a pressure loss of the fluid in the specific chamber can be decreased. Therefore, according to the valve device of the present disclosure, frequency in using the second valve member can be reduced and used longer without omitting the specific chamber.

Alternatively, the valve device may have a third passage through which the fluid flowing out of the fuel tank flows just before flowing into the specific chamber when the second valve member is open. The asymmetrical state of the two divided flows is caused by locating at least one of the outlet center and the inlet center not to be on a symmetry plane in a mirror image of the collision part, when (i) a point on an axis of the second passage at an opening of the second passage opened to the specific chamber is defined as an outlet center and (ii) a point on an axis of the third passage at an opening of the third passage opened to the specific chamber is defined as an inlet center.

Accordingly, the pressure loss of the fluid in the specific chamber can be decreased without modifying the specific chamber substantially.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An exemplary embodiment of a valve device of the present disclosure will be described hereafter referring to drawings.

Figure 1:
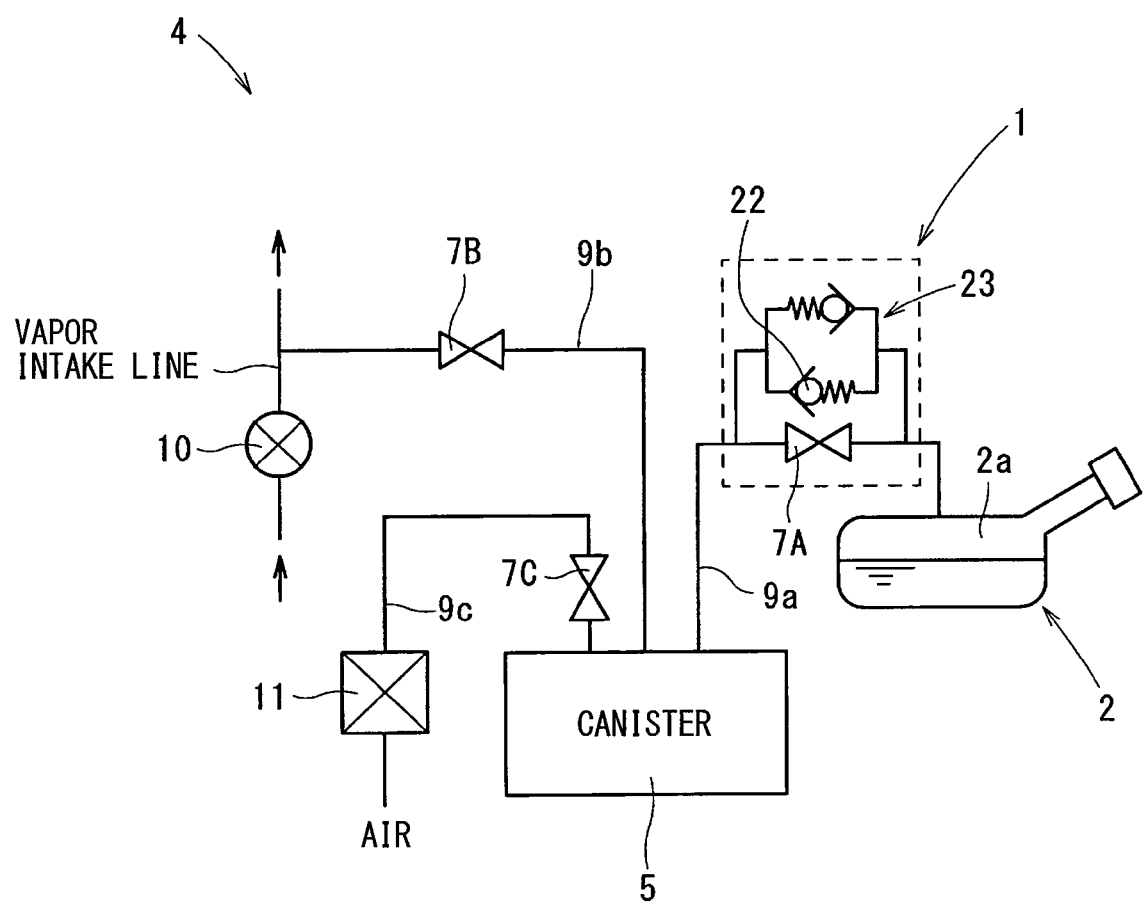
FIG. 1 is a schematic diagram of a purge system including a valve device according to an embodiment.

A valve device 1 of the present embodiment has a first valve member 3 for opening or closing a fuel tank 2 with respect to outside. The fuel tank 2 is mounted to a vehicle. The valve device 1 operates the first valve member 3 so that fluid (i.e., escape fluid) escapes and flows out of the fuel tank 2. Specifically, in a refueling for supplying fuel in the fuel tank 2, the fuel tank 2 is open to outside actively. The valve device 1 is arranged, for example, in a purge system 4 purging fuel vapor in the fuel tank 2 of the vehicle. The valve device 1 is as a tank-sealing valve for smoothing the refueling and for restricting an increase of a pressure in the fuel tank 2 by opening an air space 2a to outside. As shown in FIG. 1, the air space 2a is provided in the fuel tank 2.

In the valve device 1, the first valve member 3 and an electromagnetic solenoid 6 configure a solenoid valve 7A. The electromagnetic solenoid 6 causes a magnetic attractive force based on an electric supply from a power source mounted in the vehicle. The electromagnetic solenoid 6 has a well-known structure including a coil 6a, a fixed iron core 6b, a movable iron core 6c, a spring 6d, or the like. The first valve member 3 is operated based on the magnetic attractive force generated by the electromagnetic solenoid 6 and opens the fuel tank 2 to outside.

The purge system 4 will be described referring to FIG. 1.

The purge system 4 includes a passage 9a connecting the fuel tank 2 and a canister 5, a passage 9b connecting the canister 5 and a vapor intake line arranged downstream of a throttle valve 10, and a passage 9c opening the canister 5 to outside (i.e., the atmosphere air). The valve device 1 is disposed at the passage 9a to be capable of opening or closing the passage 9a between the fuel tank 2 and the canister 5.

The solenoid valve 7B is disposed at the passage 9b to be capable of opening or closing the passage 9b between the canister 5 and the vapor intake line. A solenoid valve 7C is disposed at the passage 9c to be capable of opening or closing the passage 9c between the canister 5 and the outside. A filter 11 is disposed in the passage 9c upstream of the solenoid valve 7C in a flow direction of outside air and restricts foreign particles included in outside air from entering to a side of the canister 5.

An electric control unit (i.e., an ECU) (not shown) mounted in the vehicle controls operations of the solenoid valves 7A, 7B, and 7C to open the fuel tank 2 to outside, to purge fuel vapor in the refueling. For example, the solenoid valve 7B is closed, and the solenoid valve 7A and the solenoid valve 7C are open in the refueling. Accordingly, the air space 2a in the fuel tank 2 is open to outside via the canister 5, and the refueling is performed smoothly. When the purging of fuel vapor is performed, the solenoid valve 7A and the solenoid valve 7B are open, and the solenoid valve 7C is closed. Accordingly, fuel vapor in the fuel tank 2, the canister 5, or the like is drawn into the vapor intake line due to a negative pressure in the vapor intake line and is supplied to an internal combustion engine.

A configuration of the valve device 1 will be described referring to FIGS. 2 to 5.

For a specific example of the configuration of the valve device 1, the valve device 1 includes a first passage 13, a second passage 14, and a specific chamber 15. An asymmetrical state of the escape fluid is caused in the specific chamber 15. The asymmetrical state will be described after.

Figure 2:
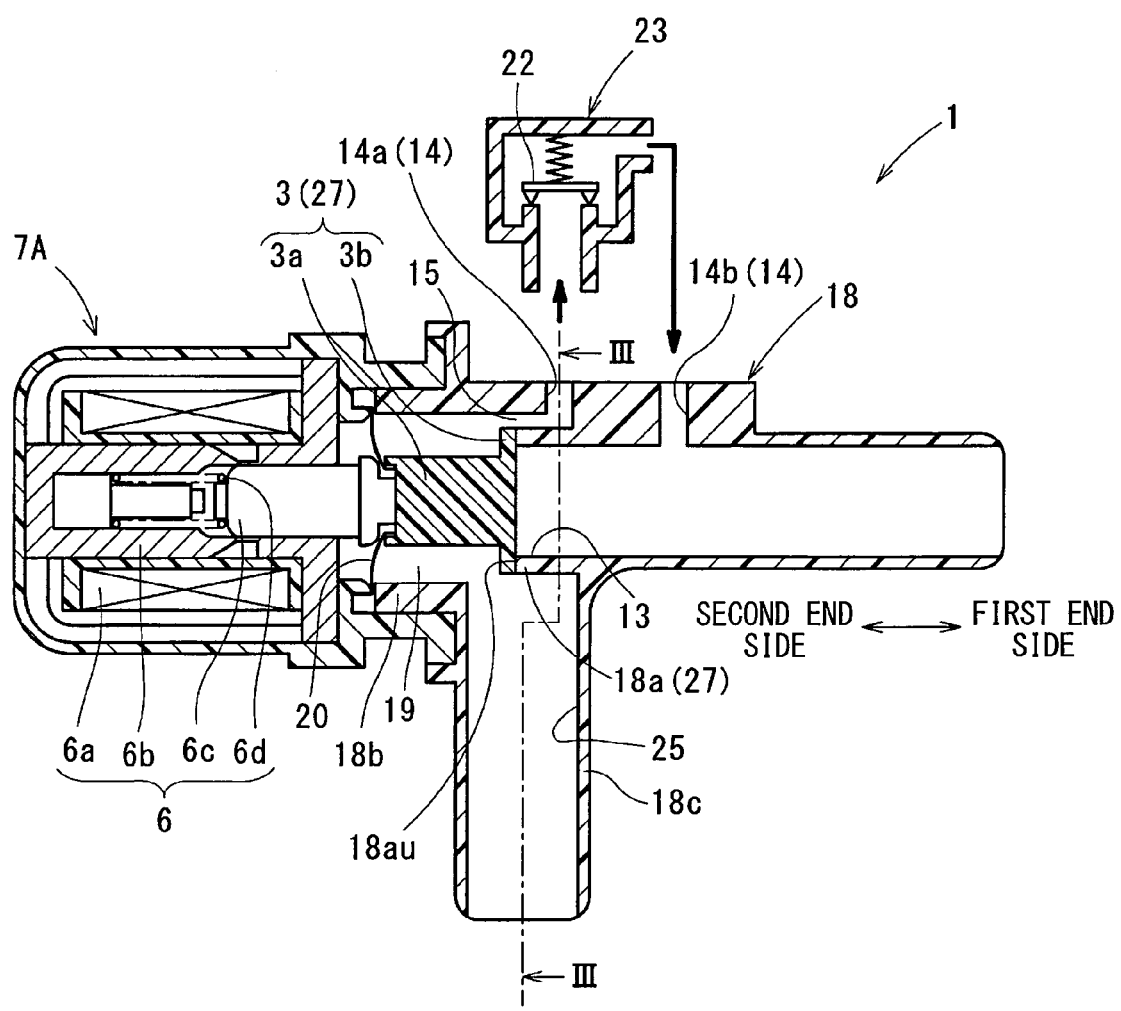
FIG. 2 is a schematic cross-sectional view of the valve device according to the embodiment.

The first passage 13 is a part of the passage 9a, and the escape fluid flowing out of the fuel tank 2 flows through the first passage 13 when the first valve member 3 is open. Specifically, the first passage 13 is provided inside of a pipe (e.g., a cylindrical pipe) 18a formed in a cylindrical shape extending linearly. The pipe 18a is a part of a resin part 18 and is integrated with a housing 18b having the first valve member 3 therein. In the housing 18b, a valve chamber 19 is provided and houses the first valve member 3. Since the pipe 18a is formed in the cylindrical shape extending linearly, the pipe 18a is symmetrical in a mirror image when being viewed from a first end side (i.e., one end side) or a second end side (i.e., the other end side) in an axial direction of the pipe 18a as shown in FIG. 2.

An opening end 18au of the pipe 18a at an upstream side in a flow direction of the escape fluid is disposed to be exposed in the valve chamber 19. The first valve member 3 provided in the valve chamber 19 opens or closes the opening end 18au. The first valve member 3 is formed in a column shape including a columnar part 3a as a main body. The first valve member 3 further includes a discoid part 3b having a longer diameter than the columnar part 3a, and the discoid part 3b is arranged coaxially with the columnar part 3a at the first end side of the pipe 18a in the axial direction. Accordingly, the first valve member 3 is symmetrical in a mirror image when being viewed from the first end side or the second end side. The discoid part 3b works as a valve part opening or closing the opening end 18au.

The first valve member 3 is arranged coaxially with the pipe 18a and movable in the axial direction of the pipe 18a. The escape fluid from the fuel tank 2 flows through the first passage 13 when the first valve member 3 opens the opening end 18au, and does not flow through the first passage 13 when the first valve member 3 closes the opening end 18*au*. That is, by moving the first valve member 3 to open or close the opening end 18*au*, the first passage 13 is open or closed with respect to the valve chamber 19.

The first valve member 3 separates from the opening end 18*au* due to the attractive force generated by the electromagnetic solenoid 6 and opens the first passage 13. That is, the electromagnetic solenoid 6 uses as an actuator actuating the first valve member 3 to move in a direction opening the first passage 13. When the first valve member 3 is moved to be open based on the attractive force generated by the electromagnetic solenoid 6, the escape fluid flows through the first passage 13 from the fuel tank 2 to be escaped from the fuel tank 2. The first valve member 3 is biased by a biasing part 20, which is formed in a flat spring shape, in a direction opposite to an attractive direction of the attractive force. The first valve member 3 closes the first passage 13 by closing the opening end 18*au* based on a biasing force applied by the biasing part 20.

The second passage 14 is provided separately from the first passage 13. When a second valve member 22 disposed separately from the first valve member 3 is open, the escape fluid flows through the second passage 14. More specifically, the second passage 14 has an opening (e.g., an opening end) 14*a* and an opening (e.g., an opening end) 14*b* separate from each other. The opening end 14*a* is provided to the resin part 18 at an outer periphery side of the pipe 18*a* to be open to the valve chamber 19. The opening end 14*b* is provided to the resin part 18 at the outer periphery side of the pipe 18*a* to be open to the first passage 13. A valve mechanism 23 including the second valve member 22 is assembled between the opening end 14*a* and the opening end 14*b* integrally with the valve device 1.

Figure 4:
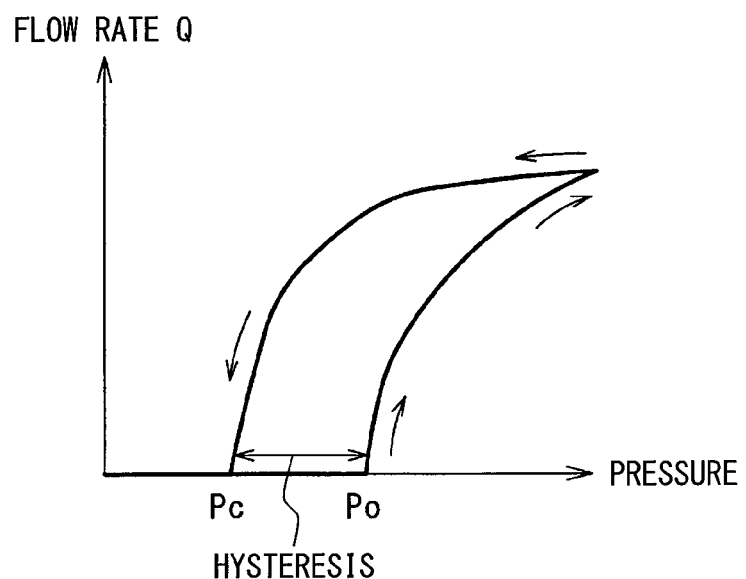
FIG. 4 is a diagram showing a hysteresis caused by operations of a relief valve according to the embodiment.

In the present embodiment, the valve mechanism 23 is a relief valve, and the second valve member 22 has a structure as a check valve. That is, when a pressure of the escape fluid from the fuel tank 2 is higher than a predetermined valve-opening pressure Po, the second valve member 22 is open so that the escape fluid flows through the second passage 14. Further, when a pressure of the escape fluid is lower than a predetermined valve-closing pressure Pc, the second valve member 22 is closed so that the escape fluid does not flow through the second passage 14. As shown in FIG. 4, the valve-opening pressure Po is larger than the valve-closing pressure Pc to have a hysteresis between the valve-opening pressure Po and the valve-closing pressure Pc.

Therefore, the valve device 1 can restrict an increase of a pressure in the fuel tank 2 by opening or closing the second valve member 22 even when an electric supply from the power source is stopped. The valve mechanism 23 further includes a check valve structure restricting a decrease of the pressure in the fuel tank 2. As shown in FIG. 1, in a passage configuration of the valve device 1, the check valve structure of the valve mechanism 23 is arranged in parallel with the check valve structure of the second valve member 22.

Figure 3:
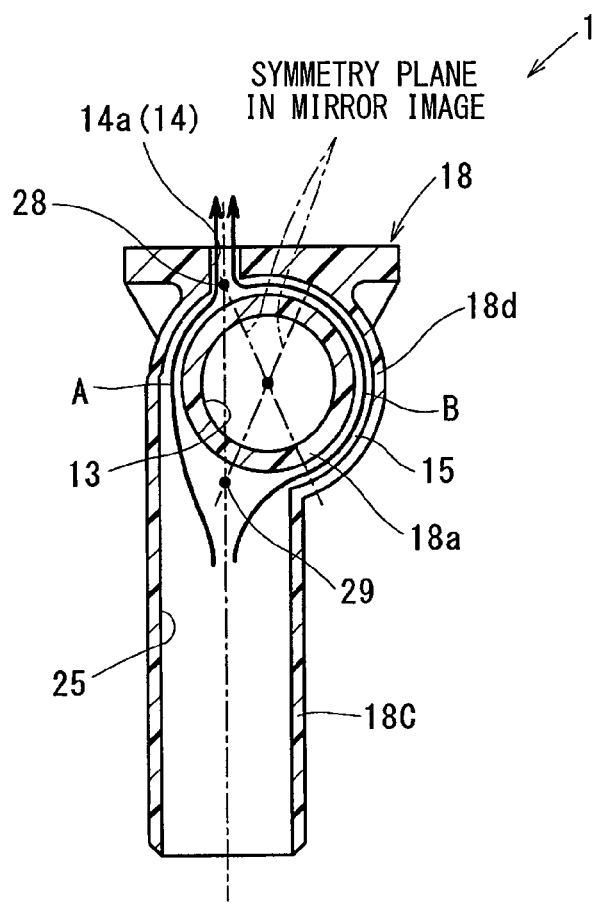
FIG. 3 is a cross-sectional view taken along a line III-III of FIG. 2 according to the embodiment.

A third passage 25 is disposed in the valve device 1. When the first valve member 3 and the second valve member 22 are open, the escape fluid flows through the third passage 25 just before flowing into the valve chamber 19. The third passage 25 is provided by a pipe 18*c* extending linearly and configures a part of the resin part 18. The pipe 18*a* is connected with the canister 5 by a pipe (not shown), and the pipe 18*c* is connected with the fuel tank 2 by a pipe (not shown). The pipe 18*a* and the pipe 18*c* are arranged so that the axial direction of the pipe 18*a* and an axial direction of the pipe 18*c* do not cross actually to each other, but the pipe 18*a* and the pipe 18*c* are connected to each other at a right angle, as shown in FIG. 3. That is, the pipe 18*a* and the pipe 18*c* are connected at a right angle in torsion.

When the second valve member 22 is open, the escape fluid flows through the specific chamber 15 just before flowing into the second passage 14. A collision part 27 is exist in the specific chamber 15 such that the escape fluid flowing into the specific chamber 1 collides the collision part 27. The specific chamber 15 is provided by the valve chamber 19. Specifically, an area of the valve chamber 19 around the first valve member 3 and an area of the valve chamber 19 around the pipe 18*a* correspond to the specific chamber 15. The first valve member 3 and the pipe 18*a* are used as the collision part 27, and the escape fluid collides an outer surface of the first valve member 3 and an outer surface of the pipe 18*a*. In the specific chamber 15, the escape fluid collides the collision part 27 and is divided into two divided flows, as shown in FIG. 3. The two divided flows are joined again downstream of the collision part 27 in the flow direction of the escape fluid. Each of the first valve member 3 and the pipe 18*a* is symmetrical in the mirror image. Accordingly, the collision part 27 is symmetrical in the mirror image.

The two divided flows divided in the specific chamber 15 are in the asymmetrical state in pressure. Specifically, a pressure loss of one of the two divided flows is different from a pressure loss of the other one of the two divided flows. Hereafter, one of the two divided flows shown as a left side flow in FIG. 3 is referred to as a divided flow A, and the other one of the two divided flows shown as a right side flow in FIG. 3 is referred to as a divided flow B. The asymmetrical state of the two divided flows is caused by locating at least one of an outlet center 28 and an inlet center 29 shown in FIG. 3 not to be on a symmetry plane in the mirror image of the first valve member 3 and a symmetry plane in the mirror image of the pipe 18*a*. In other words, at least one of the outlet center 28 and the inlet center 29 are located not to be on symmetry planes in the mirror image of the collision part 27.

The asymmetrical state will be described hereafter.

The outlet center 28 is defined as a point on an axis of the second passage 14 at an opening of the second passage 14 opened to the specific chamber 15. The inlet center 29 is defined as a point on an axis of the third passage 25 at an opening of the third passage 25 opened to the specific chamber 15.

The specific chamber 15 is provided at the outer periphery side of the first valve member 3 and at the outer periphery side of the pipe 18*a* and is formed in the cylindrical shape. That is, an outer wall 18*d* having a cylindrical shape is disposed as a part of the resin part 18 at the outer periphery side of the first valve member 3 and the outer periphery side of the pipe 18*a* coaxially with the first valve member 3 and the pipe 18*a*. As shown in FIG. 3, the specific chamber 15 is provided by a space formed in a cylindrical shape between the first valve member 3 and the outer wall 18*d* and between the pipe 18*a* and the outer wall 18*d*.

The pipe 18*a* and the pipe 18*c* are arranged so that the axial direction of the pipe 18*a* and the axial direction of the pipe 18*c* do not cross actually to each other but are connected to each other apparently at a right angle. That is, the pipe 18*a* and the pipe 18*c* are arranged to be shifted from each other in the axial direction. As shown in FIG. 3, an axis of the third passage 25 is located on a left side of an axis of the first passage 13. Furthermore, an axis of the second passage 14 is parallel with the axis of the third passage, and the first valve member 3 and the pipe 18*a* are apparently arranged on a linear line apparently when being viewed from the first end side or the second end side of the first valve member 3 and the pipe 18a. Accordingly, in FIG. 3, the axis of the second passage 14 is also at the left side of the axis of the first passage 13. Therefore, it is impossible to have a symmetry plane in a mirror image including both the outlet center 28 and the inlet center 29. In this embodiment, at least one of the outlet center 28 and the inlet center 29 is located not on the symmetry plane in the mirror image.

As a result, a length and a cross-sectional area of a flow path of the divided flow A are different from that of the divided flow B. Accordingly, a pressure loss of the divided flow A and a pressure loss of the divided flow B are different from each other.

Figure 5:
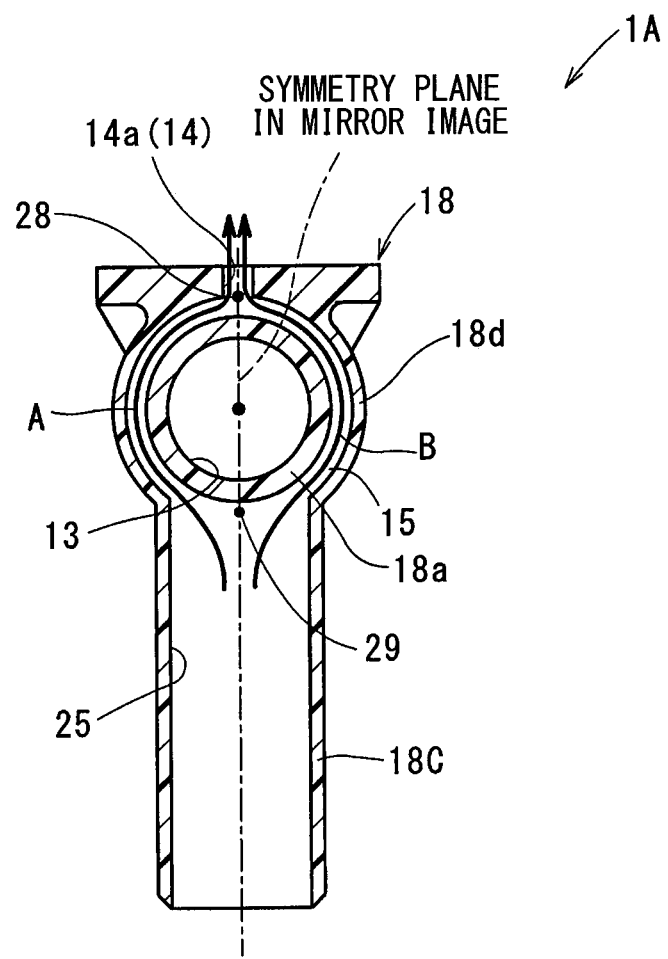
FIG. 5 is a cross-sectional view of a valve device of a comparison example taken along a line corresponding to the line III-III.

With respect to the valve device 1 of the present embodiment, in a valve device 1A shown in FIG. 5, two divided flows A and B divided in a specific chamber 15 are in a symmetrical state in which a pressure loss of the divided flow A and a pressure loss of the divided flow B are the same.

That is, according to the valve device 1A of the comparison example, an axis of a pipe 18a and an axis of a pipe 18c cross to each other and are not in torsion, as shown in FIG. 5. Accordingly, it is possible to have a symmetry plane in a mirror image including both of an outlet center 28 and an inlet center 29, and both of the outlet center 28 and the inlet center 29 are on the symmetry plane in the mirror image. Therefore, the divided flow A and the divided flow B are the same in the length and the cross-sectional area of the flow path, and a difference is not be caused between a pressure loss of the divided flow A and a pressure loss of the divided flow B.

In contrast, according to the valve device 1 of the present embodiment, the pipe 18a and the pipe 18c are arranged with a torsion. Further, the axis of the second passage 14 and the axis of the third passage 25 are arranged on the linear line when being viewed from the first end side or the second end side in the axial direction of the first valve member 3 and the pipe 18a. Accordingly, the length of the flow path of the divided flow A is shorter than the length of the flow path of the divided flow B. The cross-sectional area of the flow path of the divided flow A is enlarged at an upstream side in the specific chamber 15 adjacent to the pipe 18c in the flow direction of the escape fluid. Accordingly, the pressure loss of the divided flow A is smaller than the pressure loss of the divided flow B, in other words, the divided flow A and the divided flow B are in the asymmetrical state in the pressure loss.

According to the valve device 1 in which the divided flow A and the divided flow B are in the asymmetrical state, a pressure loss $\Delta P$ of the escape fluid in an entire of the specific chamber 15 can be reduced with respect to that of the valve device 1A in which the divided flow A and the divided flow B are in the symmetrical state. Therefore, according to the valve device 1, frequency in using of the valve mechanism 23 can be reduced and the valve mechanism 23 can be used longer.

A reason why the frequency in using of the valve mechanism 23 is reduced due to a decrease of the pressure loss $\Delta P$ will be described referring to FIGS. 6A to 6D.

Figure 6A:
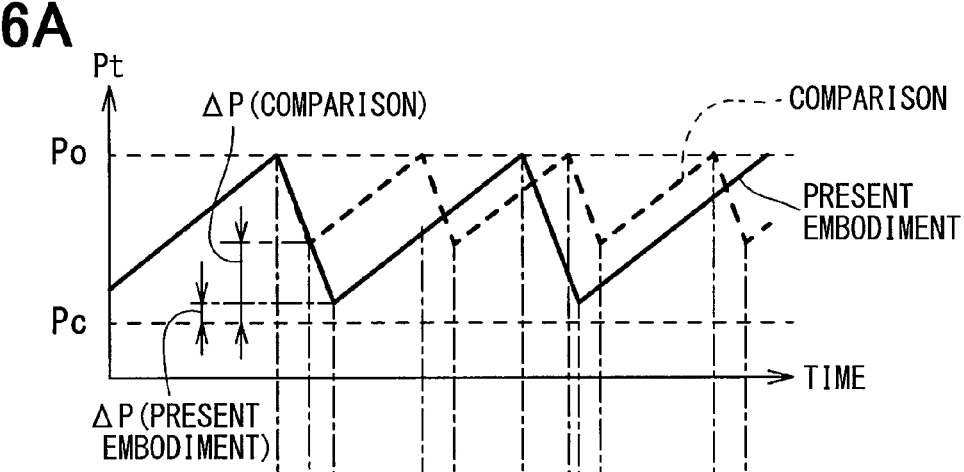
FIG. 6A is a time chart showing a variation of a pressure in a fuel tank in accordance with a time according to the embodiment.
Figure 6B:
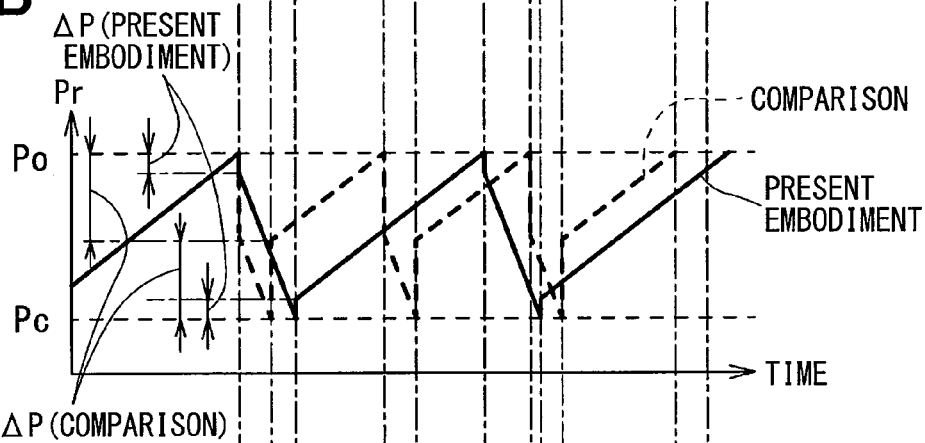
FIG. 6B is a time chart showing a variation of a pressure in a valve chamber in accordance with a time according to the embodiment.
Figure 6C:
FIG. 6C is a time chart showing an opening duration of a valve according to the embodiment.

FIG. 6A shows a variation of an inside-tank pressure Pt in the fuel tank 2, FIG. 6B shows a pressure (i.e., an inside-chamber pressure) Pr in the specific chamber 15 (i.e., in the valve chamber 19), and FIG. 6C shows a flow rate Q of the escape fluid from the fuel tank 2, in accordance with a time due to an operation of the second valve member 22 of the valve mechanism 23. In the example of FIGS. 6A to 6D, an enough amount of liquid-phase fuel is stored in the fuel tank 2, fuel vapor is in an unsaturation state in the air space 2a and the valve chamber 19, and a vapor pressure of the fuel increases generally linearly in accordance with a time, so that the vapor pressure of the fuel increases in a general proportional with an elapsed time.

Figure 6D:
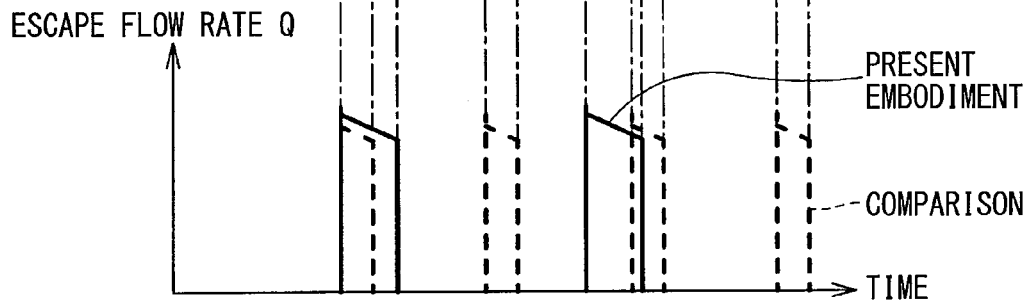
FIG. 6D is a time chart showing a variation of a flow amount of escape fluid in accordance with a time according to the embodiment.

As shown in FIGS. 6A to 6D, when the inside-tank pressure Pt and the inside-chamber pressure Pr reach the valve-opening pressure Po of the valve mechanism 23, the valve mechanism 23 is open, and the flow rate Q increases instantaneously. As shown in FIG. 4 and FIG. 6D, the flow rate Q increases generally perpendicularly with respect to the time axis from the zero-amount. While the flow rate Q increases, the inside-tank pressure Pt is kept to the valve-opening pressure Po, and the inside-chamber pressure Pr decreases generally perpendicularly with respect to the time axis until reaching a pressure value (Po−$\Delta P$). Subsequently, the inside-tank pressure Pt and the inside-chamber pressure Pr decrease generally linearly in accordance with a time while being kept in a relation of Pt−Pr=$\Delta P$. The flow rate Q decreases generally linearly in accordance with a time as the inside-tank pressure Pt and the inside-chamber pressure Pr decrease.

When the inside-chamber pressure Pr reaches a valve-closing pressure Pc of the valve mechanism 23, the valve mechanism 23 is operated to decrease the flow rate Q instantaneously and is closed. At this time, as shown in FIG. 4 and FIG. 6D, the flow rate Q decreases generally perpendicularly with respect to the time axis to the zero-amount. While the flow rate Q decreases, the inside-tank pressure Pt is kept at a pressure value (Pc+$\Delta P$), and the inside-chamber pressure Pr increases generally perpendicularly with respect to the time axis to be the pressure value (Pc+$\Delta P$). The inside-tank pressure Pt and the inside-chamber pressure Pr increase linearly in accordance with a time while having the same pressure and reach the valve-opening pressure Po again.

When the pressure loss $\Delta P$ reduces, the pressure value (Po−$\Delta P$) increases, and the pressure value (Pc+$\Delta P$) decreases. Accordingly, an opening duration of the valve mechanism 23 becomes longer, and a decrease degree of the inside-tank pressure Pt due to a single opening operation of the valve mechanism 23 increases, as shown in FIGS. 6A and 6C. Therefore, the frequency of opening and closing the valve mechanism 23 of the valve device 1 is reduced as compared with that of the valve device 1A, since the frequency of opening and closing the valve mechanism 23 reduces due to a decrease of the pressure loss $\Delta P$ according to the valve device 1 of the present embodiment.

According to the present embodiment, the valve device 1 includes the specific chamber 15 in which the asymmetrical state of the escape fluid is caused. When the second valve member 22 is open, the escape fluid from the fuel tank 2 flows through the specific chamber 15 just before flowing into the second passage 14. The specific chamber 15 therein has the collision part 27. The escape fluid flowing into the specific chamber 15 collides the collision part 27. The collision part 27 is symmetrical in the mirror image. In the specific chamber 15, the escape fluid from the fuel tank 2 collides the collision part 27 and is divided into the divided flow A and the divided flow B, and the divided flow A and the divided flow B are joined again at downstream of the collision part 27. The asymmetrical state is a difference caused between the pressure loss of the divided flow A and the pressure loss of the divided flow B.

According to the valve device in which the asymmetrical state is caused, the pressure loss $\Delta P$ of the escape fluid from the fuel tank 2 as the entire of the specific chamber 15 can be reduced, with respect to the valve device 1A in which the symmetrical state is caused. Thus, according to the valve device 1 of the exemplary embodiment, the frequency of opening and closing the valve mechanism 23 decreases, and the valve mechanism 23 can be used longer with respect to the valve mechanism 23 of the valve device 1A of the comparison example. Therefore, in the valve device 1 (i.e., the tank-sealing valve), the frequency of opening and closing the valve mechanism 23 (i.e., the relief valve) reduces, and the relief valve can be used longer even if the specific chamber 15 cannot be omitted.

The asymmetrical state is caused when the outlet center 28 and the inlet center 29 are located not on the symmetry plane in the mirror image of the collision part 27. Accordingly, the pressure loss ΔP can be decreased without modifying the specific chamber 15 substantially.

The valve device 1 is not limited to the exemplary embodiment, and various modifications can be applied to the valve device 1.

Figure 7:
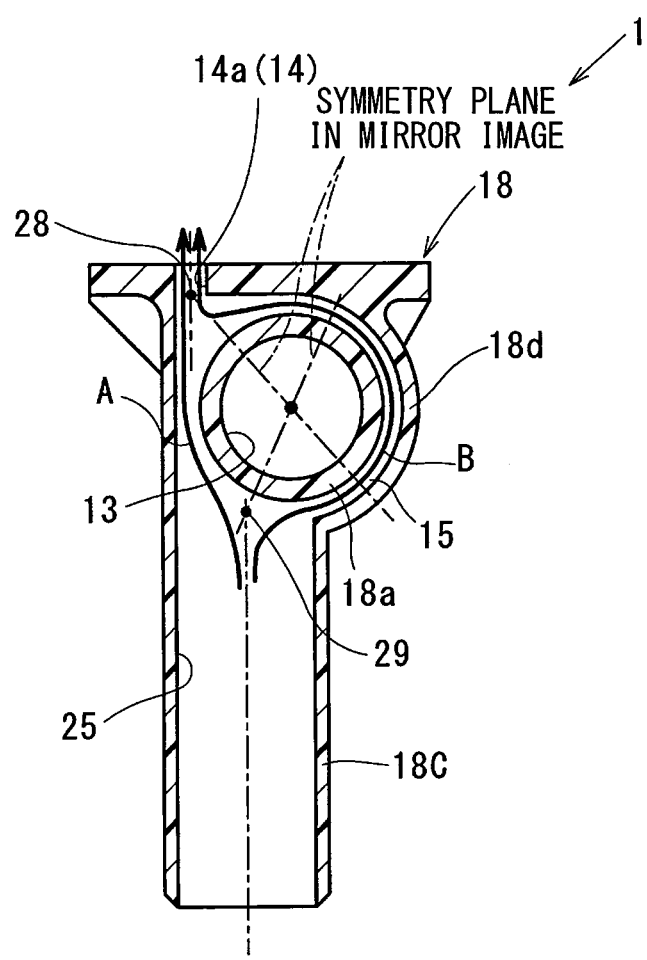
FIG. 7 is a cross-sectional view of a valve device of a modification example of FIG. 3, taken along a line corresponding to the line III-III.

In the valve device 1 of the present embodiment, the axis of the second passage 14 and the axis of the third passage 25 are arranged on the linear line apparently when being viewed from the first end side and the second end side in the axial direction of the first valve member 3 and the pipe 18a. However, arrangements of the axis of the second passage 14 and the third passage 25 are not limited to such an arrangement. For example, as shown in FIG. 7, the axis of the second passage 14 may be apparently located at the left side of the axis of the third passage 25 when being viewed from the second end side of the first valve member 3 and the pipe 18a in the axial direction.

In the valve device 1 of the present embodiment, the first valve member 3 includes the columnar part 3a, and a discoid part 3b. Further, in the valve device 1, the pipe 18a is formed in a cylindrical shape that extends linearly. Accordingly, the collision part 27 can have various symmetry planes in a mirror image. However, a configuration of the collision part 27 is not limited to such an example. For example, the collision part 27 may be formed in a rectangular in a cross-section that is perpendicular to the axial direction so that the collision part 27 has only one symmetry plane in a mirror image.

In the valve device 1 of the present embodiment, both of the first valve member 3 and the pipe 18a configure the collision part 27. However, the specific chamber 15 may be provided so that one of the first valve member 3 and the pipe 18a configures the collision part 27 in the specific chamber 15. Alternatively, the specific chamber 15 may be provided so that other parts except for the first valve member 3 and the pipe 18a configure the collision part 27 in the specific chamber 15. Further, although the actuator actuating the first valve member 3 is the electromagnetic solenoid 6 according to the valve device 1 of the present embodiment, the actuator may be an electric motor or the like.

Such changes and modifications are to be understood as being within the scope of the present disclosure as defined by the appended claims.

What is claimed is:

1. A valve device comprising:
a first valve member opening or closing a fuel tank with respect to an outside, the first valve member being operated such that a fluid flows out of the fuel tank;
a first passage through which the fluid flowing out of the fuel tank flows when the first valve member is open;
a second passage provided separately from the first passage;
a second valve member opening or closing the second passage such that the fluid flowing out of the fuel tank flows through the second passage when the second valve member is open; and
a specific chamber arranged upstream of the second passage so that the fluid flowing out of the fuel tank flows into the specific chamber just before flowing into the second passage, the specific chamber having a collision part being symmetrical in a mirror image, wherein
the specific chamber is provided such that the fluid collides the collision part and is divided into two divided flows when the second valve member is open,
the two divided flows are in an asymmetrical state in which one divided flow has a different pressure loss that is different from a pressure loss of the other divided flow,
the valve device further comprises a third passage through which the fluid flowing out of the fuel tank flows just before flowing into the specific chamber when the second valve member is open, and
when (i) an axis point of the second passage at an opening of the second passage opened to the specific chamber is defined as an outlet center, and (ii) an axis point of the third passage at an opening of the third passage opened to the specific chamber is defined as an inlet center, at least one of the outlet center and the inlet center is positioned other than the symmetry plane in the mirror image of the collision part so as to cause the asymmetrical state of teh two divided flows.

2. The valve device according to claim 1, wherein
the first passage is provided inside of a cylindrical pipe extending linearly,
the first valve member is formed in a column shape that is symmetry in a mirror-image and arranged coaxially with the cylindrical pipe to be capable of opening or closing an opening end of the cylindrical pipe,
the fluid flows through the first passage when the first valve member opens the opening end, and the fluid is restricted from flowing through the first passage when the first valve member closes the opening end,
the collision part is at least one of the first valve member and the cylindrical pipe, and
the specific chamber is provided at an outer periphery side of at least one of the first valve member and the cylindrical pipe.

3. The valve device according to claim 1, further comprising
an actuator actuating the first valve member based on an electric force generated by a power source mounted to a vehicle, wherein
the fluid flows through the first passage when the first valve member is actuated to be open based on a driving force generated by the actuator,
the second valve member has a structure as a check valve,
the second valve member is open so that the fluid flows into the second passage via the second valve member, when a pressure of the fluid is higher than a predetermined valve-opening pressure, and
the second valve member is closed so that the fluid is restricted from flowing into the second passage, when a pressure of the fluid is lower than a predetermined valve-closing pressure.

4. A valve device comprising:
a first passage provided inside of a cylindrical pipe;
a first valve member opening or closing an opening end of the cylindrical pipe of the first passage;
a second passage provided at an outer periphery side of the cylindrical pipe of the first passage;
a second valve member opening or closing an opening end of the second passage;
a third passage provided at the outer peripheral side of the cylindrical pipe of the first passage at a position different from the second passage such that a fluid flowing out of a fuel tank flows into the third passage; and a specific chamber into which the fluid flowing from the third passage flows, the specific chamber being provided immediately upstream of the second passage, wherein an axis point defined as an outlet center of the second passage opened to the specific chamber is offset from an axis point defined as an inlet center of the third passage opened to the specific chamber, and the specific chamber is provided such that the fluid flowing into the specific chamber is divided into a first divided flow and a second divided flow and that a pressure loss of the first divided flow and a pressure loss of the second divided flow are different from each other when the second valve member opens.

\* \* \* \* \*